(12) United States Patent
Li

(10) Patent No.: US 8,462,111 B2
(45) Date of Patent: Jun. 11, 2013

(54) ELECTRONIC DEVICE PROVIDING REGULATION OF BACKLIGHT BRIGHTNESS AND METHOD THEREOF

(75) Inventor: Jun Li, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 277 days.

(21) Appl. No.: 12/855,714

(22) Filed: Aug. 13, 2010

(65) Prior Publication Data

US 2011/0316777 A1    Dec. 29, 2011

(30) Foreign Application Priority Data

Jun. 28, 2010   (CN) .......................... 2010 1 0210840

(51) Int. Cl.
*G09G 5/08*   (2006.01)

(52) U.S. Cl.
USPC ........... 345/158; 345/102; 345/651; 345/662; 345/677

(58) Field of Classification Search
USPC .................................. 345/102, 651, 662, 677
See application file for complete search history.

(56) References Cited

U.S. PATENT DOCUMENTS 7,498,951 B2 *   3/2009   Wardimon ................. 340/691.3
2009/0253468 A1 *  10/2009  Oberstelehn et al. ......... 455/570

FOREIGN PATENT DOCUMENTS

WO    WO 2009136605    * 11/2009

* cited by examiner

*Primary Examiner* — Olumide T Ajibade Akonai
*Assistant Examiner* — Edward Zhang
(74) *Attorney, Agent, or Firm* — Altis Law Group, Inc.

(57) ABSTRACT

An electronic device includes a display module, a function key, a motion sensor, a determination module, and a regulation module. The motion sensor is operable to acquire a coordinate of the electronic device. The determination module is operable to determine whether the electronic device is in the upright position based on the coordinate. The regulation module regulates backlight brightness of the display module when the function key is operative and the specific application is not executed when the electronic device is in the upright position.

9 Claims, 3 Drawing Sheets

ELECTRONIC DEVICE PROVIDING REGULATION OF BACKLIGHT BRIGHTNESS AND METHOD THEREOF

BACKGROUND

1. Technical Field

The present disclosure relates to an electronic device providing regulation of backlight brightness of a display module of the electronic device and method thereof.

2. Description of Related Art

Electronic devices such as mobile phones, personal digital assistants (PDAs), digital still cameras (DSCs), for example, utilize display modules. These display modules use backlights for temporary lighting in darkness. However, regulating backlight brightness of the display module is inconvenient, requiring values to be reset through an application menu.

DETAILED DESCRIPTION

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
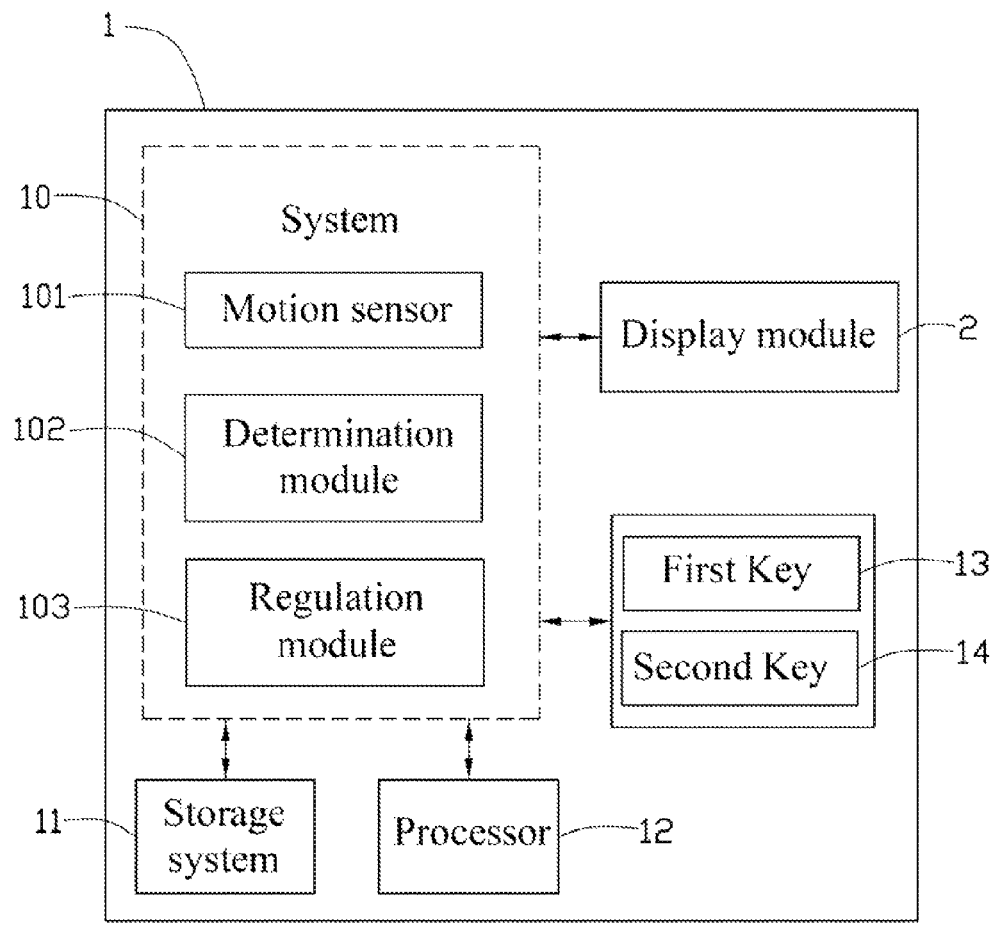
FIG. 1 is a block diagram of one embodiment of an electronic device.

FIG. 1 is a block diagram of one embodiment of an electronic device 1. The electronic device 1 includes a display module 2, a system 10, a storage system 11, a processor 12, a first key 13, and a second key 14. The system 10 includes a motion sensor 101, a determination module 102, and a regulation module 103. The processor 12 may execute one or more programs stored in the storage system 11 to provide functions for the display module 2, the first key 13, the second key 14, the determination module 102, and the regulation module 103.

The electronic device 1 is generally controlled and coordinated by an operating system, such as UNIX, Linux, Windows, Mac OS, an embedded operating, or any other compatible system. Alternatively, the electronic device 1 may be controlled by a proprietary operating system. Typical operating systems control and schedule computer processes for execution, perform memory management, provide file system, networking, and I/O services, and provide a user interface, such as a graphical user interface (GUI), among other tasks.

The first key 13 and the second key 14 may be physical keys disposed on the electronic device 1 or virtual keys displayed on the display module 2, and are operable to execute a default function of the electronic device 1 when the electronic device 1 is in a standby state (e.g., when no application of the electronic device 1 is running). The first key 13 and the second key 14 can be used to increase and decrease volume of a speaker (not shown) of the electronic device 1 when the electronic device 1 is in the standby state. The first key 13 and the second key 14 can also be used to execute a specific function when a specific application of the electronic device 1 is executed. For example, the first key 13 and the second key 14 can be used to execute a zoom function of a camera (e.g., when the keys 13, 14 are operative (e.g., pressed or touched)) of the electronic device 1 when a camera function of the electronic device 1 is executed. In the embodiment, the first key 13 and the second key 14 are used to regulate backlight brightness of the display module 2.

Figure 2:
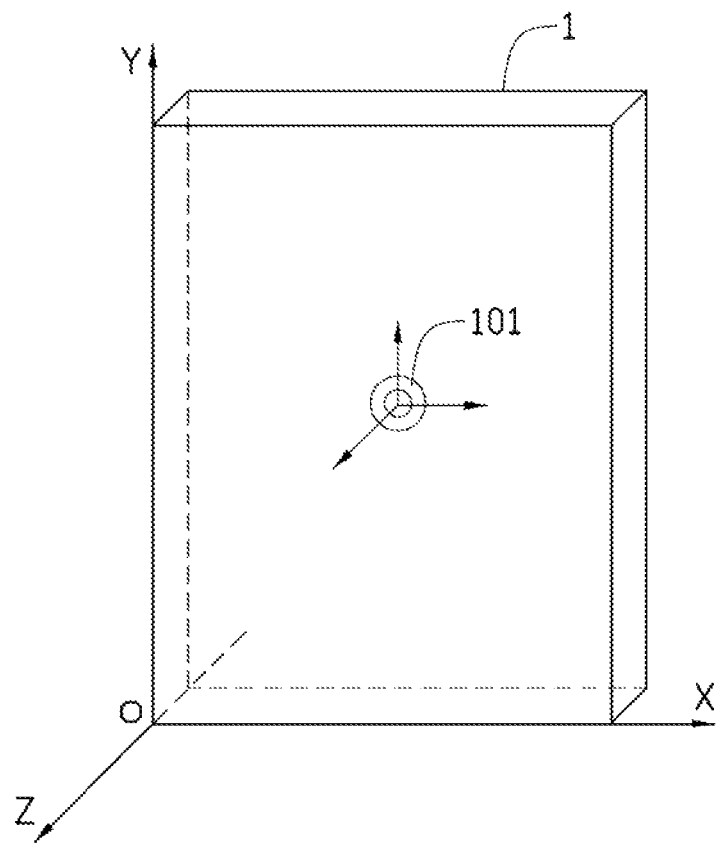
FIG. 2 is a diagram showing coordinate axes of the electronic device of FIG. 1.

FIG. 2 is a diagram showing coordinate axes of the electronic device 1 of FIG. 1. The motion sensor 101 may be an accelerometer operable to acquire a coordinate of the electronic device 1. The coordinate is based on a coordinate axis defined as an X axis being along the width of the electronic device 1 and positive on the right direction, a Y axis being along the height of the electronic device 1 and positive on the down direction, and a Z axis being along the depth of the electronic device 1 and positive on the direction of the display module 2. When the electronic device 1 is in an upright position, the coordinate is represented as (0, −g, 0). Normal gravitational acceleration is known to be 9.8 m/s$^2$ or the equivalent 9.8N/kg, so g is measurable as 9.8.

The determination module 102 determines whether the electronic device 1 is in the upright position and whether the specific application of the electronic device 1 is executed. The determination module 102 determines whether a value corresponding to the y axis of the coordinate is about −9.8 (approximately −9.0 to −9.8) and values corresponding to the x axis and z axis of the coordinate are both zero. For example, the electronic device may be in the upright position if the value corresponding to the y axis of the coordinate is about −9.8 and the values corresponding to the x axis and z axis of the coordinate are both zero.

The regulation module 103 is operable to regulate the backlight brightness of the display module 2 when the first key 13 and the second key 14 are operative and the specific application is not executed when the electronic device 1 is the upright position. Particularly, the regulation module 103 can increase the backlight brightness when the first key 13 is operative and decrease the backlight brightness when the second key 14 is operative.

Figure 3:
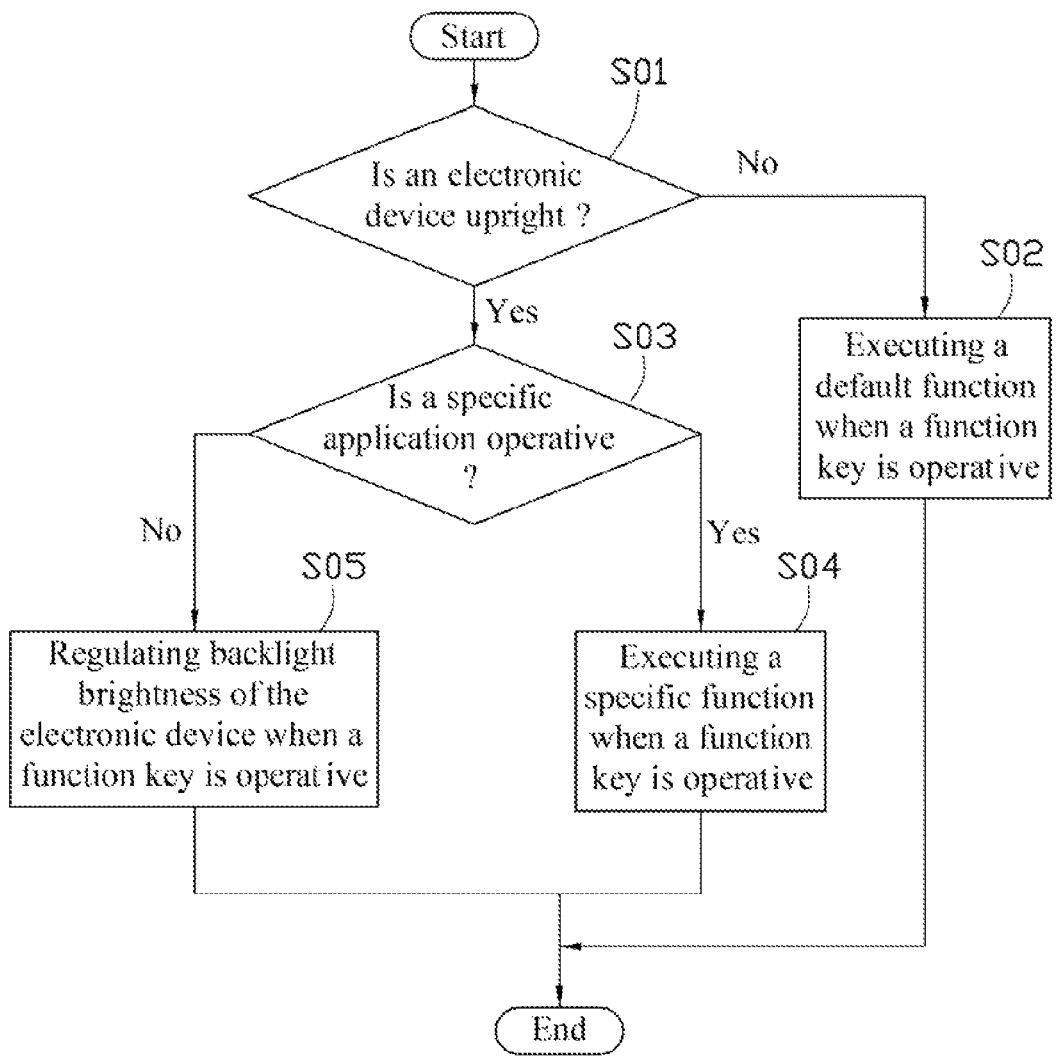
FIG. 3 is a flowchart illustrating one embodiment of a method of providing regulation of backlight brightness of a display module of an electronic device.

FIG. 3 is a flowchart illustrating one embodiment of a method for regulating the backlight brightness of the display module 2 of the electronic device 1. Depending on the embodiment, additional blocks in the flow of FIG. 3 may be added, others removed, and the ordering of the blocks may be changed.

In block S01, the determination module 102 determines whether the electronic device 1 is in the upright position.

If the electronic device 1 is not in the upright position, in block S02, the electronic device 1 executes the default function when the first key 13 or the second key 14 is operative.

If the electronic device 1 is in the upright position, in block S03, the determination module 102 determines whether the specific application of the electronic device 1 is executed.

If the specific application is executed, in block S04, the electronic device 1 executes the specific function when the first key 13 or the second key 14 is operative.

If no specific application is executed, in block S05, the regulation module 103 regulates the backlight brightness when the first key 13 or the second key 14 is operative.

The present disclosure provides a ready method to regulate backlight brightness of a display module of an electronic device without changing setting through an application menu of the electronic device. It is convenient for the electronic device to provide temporary lighting in darkness.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method of regulating backlight brightness of a display module of an electronic device, the electronic device comprising at least one function key and a motion sensor that acquires a coordinate of the electronic device, wherein the coordinate is based on a coordinate axis defined as: an X axis being along the width of the electronic device and positive in the right direction, a Y axis being along the length of the electronic device and positive in the down direction, and a Z axis being along the depth of the electronic device and positive in the direction of the display module, the method comprising:
   determining whether the electronic device is in an upright position, comprising:
      determining whether a value corresponding to the y axis of the coordinate is about −9.8 and other values corresponding to the x axis and the z axis of the coordinate are both zero; and
      determining the electronic device is in the upright position if the value corresponding to the y axis of the coordinate is about −9.8 and the values corresponding to the x axis and the z axis of the coordinate are both zero;
   determining whether a specific application of the electronic device is executed; and
   regulating the backlight brightness of the display module when the at least one function key is operative and the specific application is not executed when the electronic device is in the upright position.

2. The method of claim 1, wherein the step of regulating the backlight brightness further comprises:
   increasing the backlight brightness when the function key is operative.

3. The method of claim 1, wherein the step of regulating the backlight brightness further comprises:
   decreasing the backlight brightness when the function key is operative.

4. An electronic device, comprising:
   a storage system;
   at least one processor;
   one or more programs stored in the storage system and being executable by the at least one processor;
   a motion sensor operable to acquire a coordinate of the electronic device, wherein the coordinate is based on a coordinate axis defined as: an X axis being along the width of the electronic device and positive in the right direction, a Y axis being along the length of the electronic device and positive in the down direction, and a Z axis being along the depth of the electronic device and positive in the direction of the display module;
   a determination module operable to determine whether the electronic device is in the upright position based on the coordinate and whether a specific application of the electronic device is executed, wherein the determination module determines the electronic device is in the upright position when a value corresponding to the y axis of the coordinate is about −9.8 and other values corresponding to the x axis and the z axis of the coordinate are both zero;
   a display module;
   at least one function key; and
   a regulation module operable to regulate backlight brightness of the display module when the at least one function key is operative and the specific application is not executed when the electronic device is in the upright position.

5. The electronic device of claim 4, wherein the regulation module increases the backlight brightness when the function key is operative.

6. The electronic device of claim 4, wherein the regulation module decreases the backlight brightness when the function key is operative.

7. A non-transitory storage medium having stored thereon instructions that, when executed by a processor, causing the processor to perform a method providing regulation of backlight brightness of a display module of an electronic device, the electronic device comprising at least one function key and a motion sensor that acquires a coordinate of the electronic device, wherein the coordinate is based on a coordinate axis defined as: an X axis being along the width of the electronic device and positive in the right direction, a Y axis being along the length of the electronic device and positive in the down direction, and a Z axis being along the depth of the electronic device and positive in the direction of the display module, wherein the method comprises:
   determining whether the electronic device is in an upright position, comprising:
      determining whether a value corresponding to the y axis of the coordinate is about −9.8 and other values corresponding to the x axis and the z axis of the coordinate are both zero; and
      determining the electronic device is in the upright position if the value corresponding to the y axis of the coordinate is about −9.8 and the values corresponding to the x axis and z axis of the coordinate are both zero;
   determining whether a specific application of the electronic device is executed; and
   regulating the backlight brightness of the display module when the at least one function key is operative and the specific application is not executed when the electronic device is in the upright position.

8. The non-transitory storage medium of claim 7, wherein the step of regulating the backlight brightness further comprises:
   increasing the backlight brightness when the function key is operative.

9. The non-transitory storage medium of claim 7, wherein the step of regulating the backlight brightness further comprises:
   decreasing the backlight brightness when the function key is operative.

* * * * *